(12) United States Patent
Mizukami et al.

(10) Patent No.: US 11,524,577 B2
(45) Date of Patent: Dec. 13, 2022

(54) VEHICLE CONTROL SYSTEM

(71) Applicant: TOYOTA JIDOSHA KABUSHIKI KAISHA, Toyota (JP)

(72) Inventors: Tatsuki Mizukami, Susono (JP); Kuninori Kumagai, Sunto-gun (JP); Satoshi Yamanaka, Gotemba (JP); Kazumi Hoshiya, Gotemba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/702,955

(22) Filed: Mar. 24, 2022

(65) Prior Publication Data
US 2022/0340006 A1 Oct. 27, 2022

(30) Foreign Application Priority Data

Apr. 23, 2021 (JP) .............................. JP2021-073115

(51) Int. Cl.
*G06F 1/00* (2006.01)
*B60K 26/02* (2006.01)

(52) U.S. Cl.
CPC .................................. *B60K 26/021* (2013.01)

(58) Field of Classification Search
CPC ........ B60K 26/00; B60K 26/021; B60N 2/99; B60N 2002/0288
See application file for complete search history.

(56) References Cited

U.S. PATENT DOCUMENTS

| | | | |
|---|---|---|---|
| 2007/0142987 A1* | 6/2007 | Takamatsu ............ | B60W 30/00 701/41 |
| 2008/0073959 A1* | 3/2008 | Anikin .................... | B60N 2/986 297/284.9 |
| 2017/0036669 A1* | 2/2017 | Kanou .................... | B60K 6/445 |
| 2019/0170245 A1* | 6/2019 | Kim ....................... | F16H 61/0437 |
| 2020/0309042 A1* | 10/2020 | Otsubo ................... | B60W 50/10 |

FOREIGN PATENT DOCUMENTS

| | | |
|---|---|---|
| JP | 2005-301441 A | 10/2005 |
| JP | 2015-209791 A | 11/2015 |

* cited by examiner

*Primary Examiner* — John Kwon
(74) *Attorney, Agent, or Firm* — Oliff PLC

(57) ABSTRACT

A vehicle control system configured to reduce physical stress on a driver to operate an accelerator pedal without reducing acceleration feel. The vehicle control system selects a first driving force property if an estimated stress on an ankle is less than a threshold value, and selects a second driving force property if the estimated stress on the ankle is greater than the threshold value to reduce the stress on the ankle. When the second driving force property is selected, a target driving force is reduced less than a target driving force calculated based on the first driving force property. In this case, the vehicle control system reduces a difference between: a ratio of acceleration to a pedal force given that the first driving force property is selected; and a ratio of acceleration to the pedal force given that the second driving force property is selected.

5 Claims, 18 Drawing Sheets

VEHICLE CONTROL SYSTEM

CROSS REFERENCE TO RELATED APPLICATIONS

The present disclosure claims the benefit of Japanese Patent Application No. 2021-073115 filed on Apr. 23, 2021 with the Japanese Patent Office, the disclosure of which are incorporated herein by reference in its entirety.

BACKGROUND

Field of the Disclosure

Embodiments of the present disclosure relate to the art of a vehicle control system configured to control a driving force to propel a vehicle determined based on a depression of an accelerator pedal.

Discussion of the Related Art

JP-A-2015-209791 describes a power train control device of a vehicle which can reduce a burden of a driver at an accelerator operation without complicating a vehicle structure. The control device described in JP-A-2015-209791 is configured to control a driving force to propel a vehicle on the basis of a driving force characteristic determining a target driving force in accordance with an accelerator opening (i.e., a position of an accelerator pedal). According to the teachings of JP-A-2015-209791, the control device comprises a tactile sensor which detects a drive attitude of a driver, and estimates magnitude of an ankle burden at an accelerator operation of the driver on the basis of a vertical friction force which is detected by the tactile sensor. When the ankle burden is estimated to be relatively small, the target driving force is set based on a standard characteristic. Whereas, when the ankle burden is estimated to be relatively large, the target driving force is set based on a corrected characteristic to be reduced less than that determined based on the standard characteristic.

JP-A-2005-301441 describes a gas pedal whose initial angle and play angle can be adjusted easily. According to the teachings of JP-A-2005-301441, the initial angle and the play angle of the gas pedal are adjusted by an electric actuator so that a relationship between a treading angle of the gas pedal and a reaction force can be set arbitrarily at a driver's liking.

As described, the control device taught by JP-A-2015-209791 is configured to estimate a burden on the ankle during operation of the accelerator pedal. In general, drivers operate accelerator pedals while placing his/her heels on floors. For example, when a depression of the accelerator pedal is shallow, a foot angle between the bottom of the foot and a shin is small, and hence stresses on the ankle and the calf muscle would be increased. In this situation, according to the teachings of JP-A-2015-209791, the target driving force is set based on the correction characteristic so that the target driving force is reduced. Consequently, the driver is required to depress the accelerator pedal deeper to generate a desired driving force. According to the teachings of JP-A-2015-209791, therefore, opportunities to operate the vehicle while keeping the accelerator pedal at a small angle may be reduced.

As can be seen from FIG. 1, according to the teachings of JP-A-2015-209791, the target drive force is changed at a same rate within a normal range of position of the accelerator pedal between a first threshold position APO01 and a second threshold position APO02, in both cases in which the standard characteristic is selected and in which the corrected characteristic is selected. According to the teachings of JP-A-2015-209791, therefore, a difference between the target driving force set based on the standard characteristic and the target driving force set based on the corrected characteristic may be minimized. In addition, a pedal stroke available in normal operation may be increased.

However, if the target driving force is reduced based on the corrected characteristic as taught by JP-A-2015-209791, the driver may become frustrated due to lack of a driving force. As described, according to the teachings of JP-A-2015-209791, the target driving force is reduced based on the corrected characteristic without changing the change rate with respect to a position of the accelerator pedal. As a result, as indicated by the horizontal arrow in FIG. 2, the normal range of position of the accelerator pedal is shifted to a deeper range (i.e., to the right side in FIG. 2). In this case, the driver has to operate the accelerator pedal within a range where a pedal load (i.e., a required pedal force) is larger indicated by the vertical arrow. That is, when the corrected characteristic is selected to set the target driving force, the driver is required to apply a greater pedal force to the accelerator pedal to depress the accelerator pedal deeper. In this situation, although the target driving force is changed at the same rate as that based on the standard characteristic, the driver would have to apply a greater pedal force to the accelerator pedal to operate the accelerator pedal. For this reason, the driver would become frustrated due to lack of a driving force.

SUMMARY

Aspects of the present disclosure have been conceived noting the foregoing technical problems, and it is therefore an object of the present disclosure to provide a vehicle control system configured to reduce physical stress on a driver to operate an accelerator pedal without reducing acceleration feel.

An exemplary embodiment of the present disclosure relates to a vehicle control system that is configured to: increase a reaction force of an accelerator pedal counteracting a pedal force applied to the accelerator pedal with an increase in depression of the accelerator pedal; determine a property of a driving force that governs a target driving force with respect to a position of the accelerator pedal; estimate a stress on an ankle and a leg of a driver operating the accelerator pedal on a seat of a vehicle based on a posture of the driver; select a first driving force property as a standard property in a case that the estimated stress on the ankle is less than a predetermined correction threshold; select a second driving force property in a case that the estimated stress on the ankle is equal to or greater than the correction threshold, so as to reduce the target driving force less than the target driving force determined based on the first driving force property within a usual position range of the accelerator pedal in an entire range of movement of the accelerator pedal, thereby reducing the stress on the ankle; calculate the target driving force based on the position of the accelerator pedal and the selected driving force property; and control the driving force to propel the vehicle based on the calculated target driving force. In order to achieve the above-explained objective, according to the exemplary embodiment of the present disclosure, the vehicle control system is provided with a controller that selects the property of the driving force from the first driving force property and the second driving force property based on the estimated stress on the ankle, and that calculates the target driving force to propel the vehicle. Specifically, the controller is configured to: reduce the target driving force with respect to the position of the accelerator pedal less than the target driving force calculated based on the first driving force property when selecting the second driving force property; and reduce a difference between: a ratio of acceleration of the vehicle established by applying the pedal force to the accelerator pedal to the pedal force given that the first driving force property is selected; and a ratio of acceleration of the vehicle established by applying the pedal force to the accelerator pedal to the pedal force given that the second driving force property is selected.

In a non-limiting embodiment, the controller may be further configured to reduce the difference between said ratios of the acceleration within the usual position range of the accelerator pedal, by increasing a ratio of an increase in the target driving force to an increase in the depression of the accelerator pedal given that the second driving force property is selected, greater than a ratio of an increase in the target driving force to an increase in the depression of the accelerator pedal given that the first driving force property is selected.

In a non-limiting embodiment, the controller may be further configured to determine the ratio of the increase in the target driving force to the increase in depression of the accelerator pedal given that the second driving force property is selected based on the estimated stress on the ankle.

In a non-limiting embodiment, the vehicle may comprise an actuator that changes the reaction force of the accelerator pedal, and the controller may be further configured to reduce the difference between the ratios of the acceleration by reducing the reaction force of the accelerator pedal by the actuator.

In a non-limiting embodiment, the controller may be further configured to determine an amount of reduction in the reaction force of the accelerator pedal by the actuator based on the estimated stress on the ankle.

Thus, according to the exemplary embodiment of the present disclosure, the property of the driving force is adjusted based on the estimated stress on the ankle of the driver operating the accelerator pedal. For example, when the estimated stress on the ankle is less than the correction threshold, the first driving force property as a standard property is selected. By contrast, when the estimated stress on the ankle is equal to or greater than the correction threshold, the second driving force property is selected so that the target driving force with respect to a position of the accelerator pedal is reduced from the target driving force determined based on the first driving force property. Consequently, the driver will depress the accelerator pedal deeper to achieve a desired driving force compared to the case in which the first driving force property is selected. For this reason, the driver does not have to keep the foot angle to a narrow angle to operate the accelerator pedal within the usual position range. According to the exemplary embodiment of the present disclosure, therefore, a foot angle may be maintained wider to operate the accelerator pedal within the usual position range so that the stress on the ankle of the driver is reduced.

As described, the stress on the ankle may be reduced by reducing the target driving force with respect to a position of the accelerator pedal based on the second driving force property. However, as a result of reducing the target driving force with respect to a position of the accelerator pedal, the driver might feel a lack of driving force or acceleration with respect to the current position of the accelerator pedal. In order to avoid such disadvantage, when selecting the second driving force property, the controller according to the exemplary embodiment of the present disclosure reduces the difference between: the ratio of (longitudinal) acceleration of the vehicle to the pedal force given that the first driving force property is selected; and the ratio of (longitudinal) acceleration of the vehicle to the pedal force given that the second driving force property is selected. For example, such difference between the above-mentioned ratios of acceleration may be reduced by increasing the ratio of increase in the target driving force to the increase in depression of the accelerator pedal given that the second driving force property is selected, compared to the ratio of increase in the target driving force to the increase in depression of the accelerator pedal given that the first driving force property is selected. Instead, such difference between the above-mentioned ratios of acceleration may also be reduced by reducing the reaction force of the accelerator pedal against the pedal force applied thereto by the actuator. Consequently, in the case of selecting the second driving force property to reduce the stress on the ankle of the driver, the target driving force is reduced and the ratio of acceleration of the vehicle to the pedal force is increased. That is, it is possible to reduce the difference between: the ratio of acceleration to the pedal force when the first driving force property is selected; and the ratio of acceleration to the pedal force when the second driving force property is selected. According to the exemplary embodiment of the present disclosure, therefore, the physical stress on the driver to operate the accelerator pedal can be reduced properly without causing a lack of driving force and acceleration by selecting the second driving force property.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION

Embodiments of the present disclosure will now be explained with reference to the accompanying drawings. Note that the embodiments shown below are merely examples of the present disclosure which should not limit a scope of the present disclosure.

Figure 3:
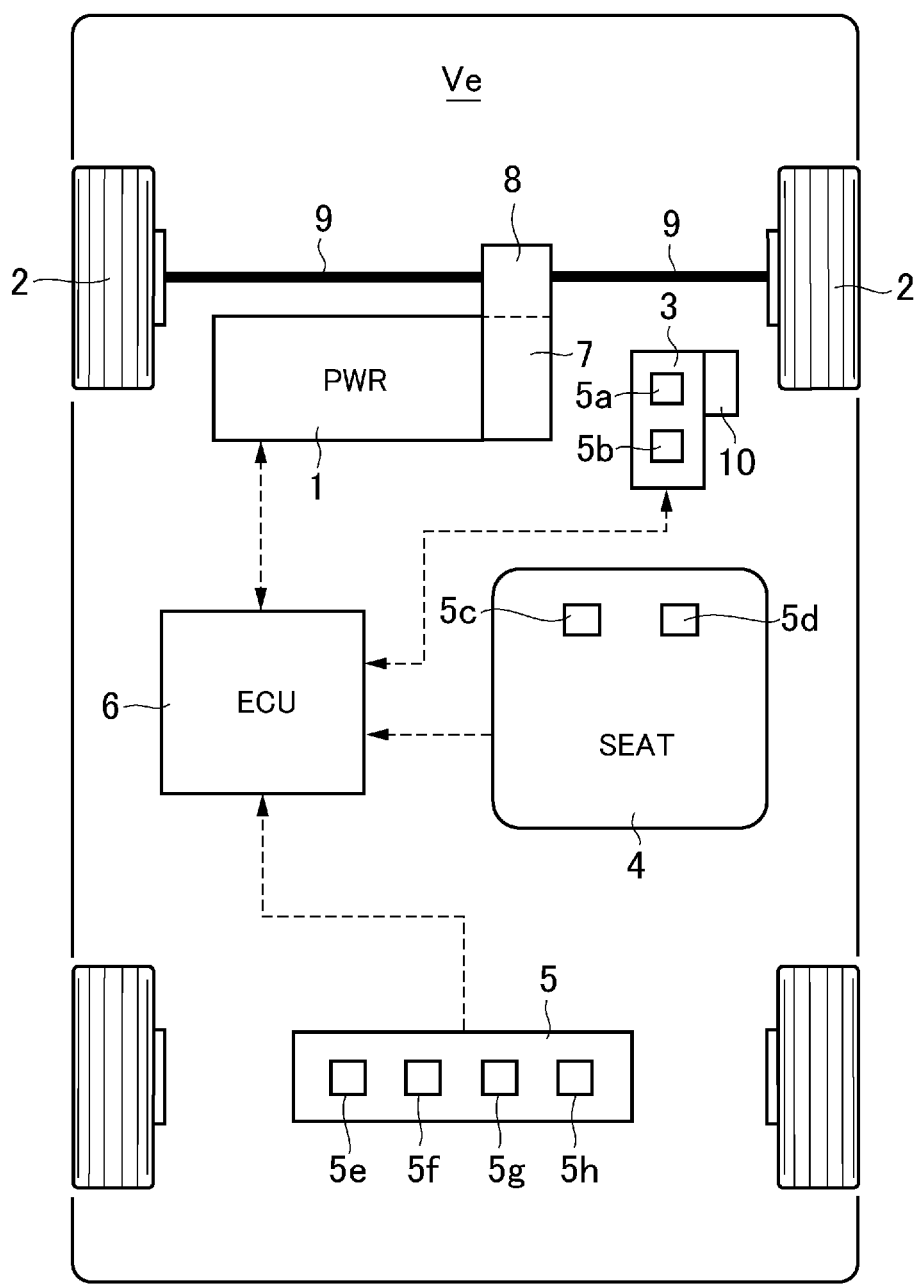
FIG. 3 is a schematic illustration showing a structure of a vehicle to which the control system according to the exemplary embodiment of the present disclosure is applied.

Referring now to FIG. 3, there is shown one example of a drive system and a control system of a vehicle Ve to which the vehicle control system according to the exemplary embodiment of the present disclosure is applied. The vehicle Ve comprises a prime mover (referred to as "PWR" in FIG. 1) 1, a pair of drive wheels 2, an accelerator pedal 3, a seat 4, a detector 5, and a controller (referred to as "ECU" in FIG. 1) 6.

For example, an internal combustion engine such as a gasoline engine and a diesel engine may be adopted as the prime mover 1. An output power of the engine may be adjusted electrically, and the engine may be started and stopped electrically according to need. Given that the gasoline engine is adopted as the prime mover 1, an opening degree of a throttle valve, an amount of fuel supply or fuel injection, a commencement and a termination of ignition, an ignition timing etc. may be controlled electrically. Otherwise, given that the diesel engine is adopted as the prime mover 1, an amount of fuel injection, an injection timing, an opening degree of a throttle valve of an EGR (Exhaust Gas Recirculation) system etc. may be controlled electrically. Further, an electric motor such as a permanent magnet type synchronous motor and an induction motor may also be adopted as the prime mover 1. Those kinds of motors may serve not only as a motor to generate torque when driven by electricity suppled thereto, but also as a generator to generate electricity when rotated by a torque applied thereto. That is, a motor-generator may also be adopted as the prime mover 1. In this case, the prime mover 1 is switched between a motor and a generator by electrically controlling the prime mover 1, and an output speed and an output torque of the prime mover 1 may be controlled electrically.

Figure 1:
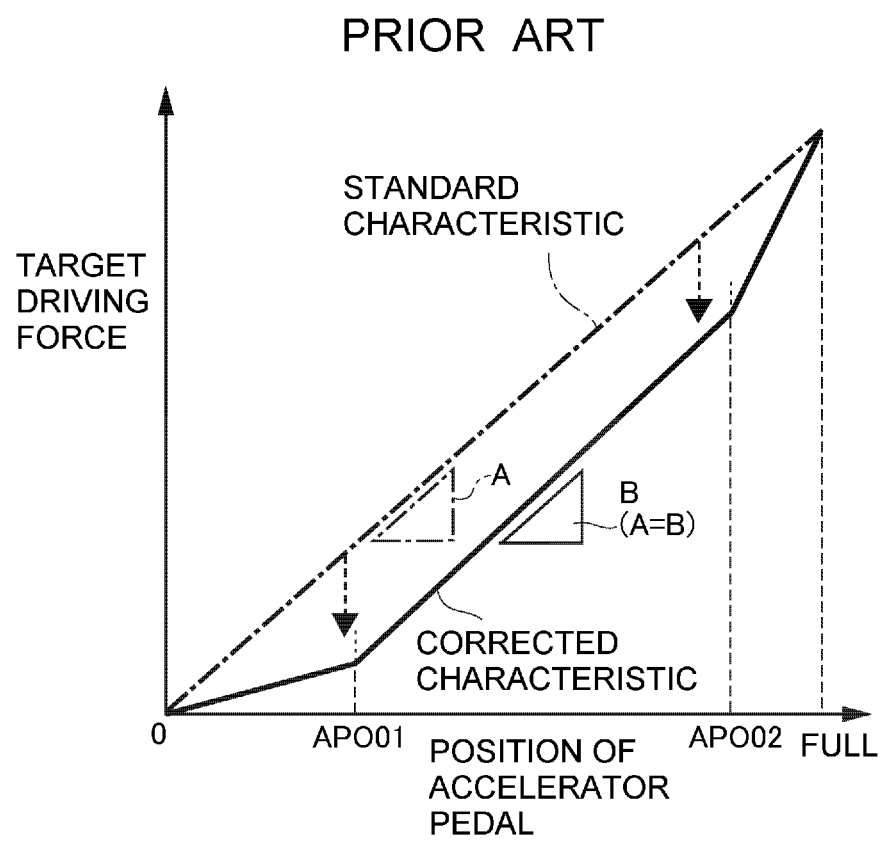
FIG. 1 is a map determining a target driving force based on a standard characteristic or a corrected characteristic according to the prior art.
Figure 2:
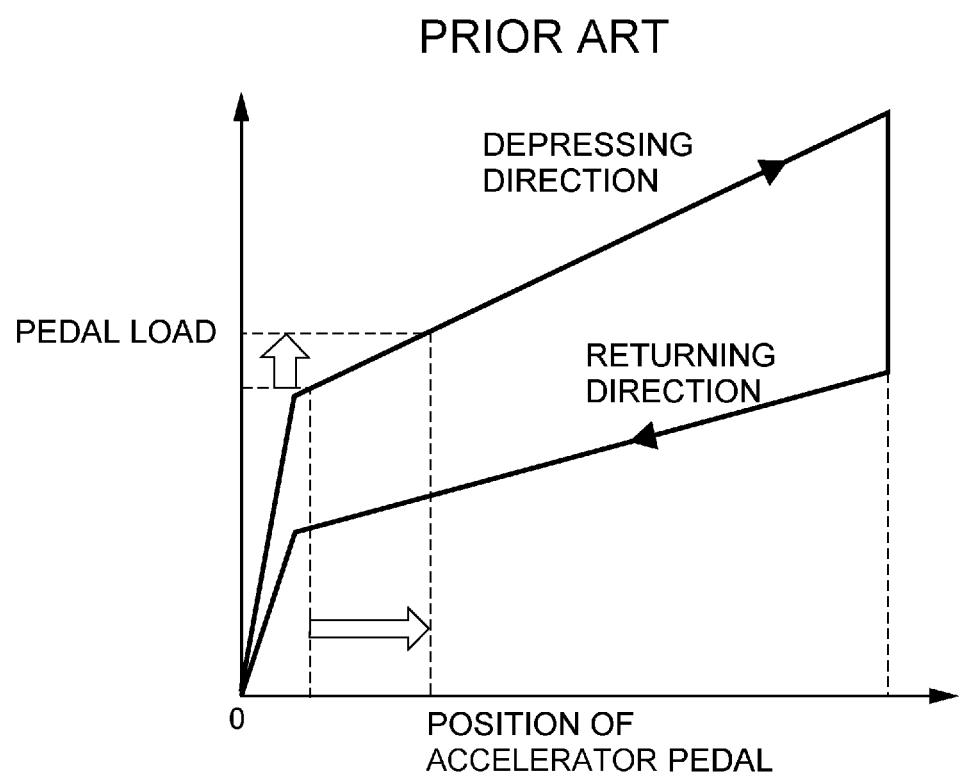
FIG. 2 is a graph indicating a required pedal force to operate an accelerator pedal according to the prior art.

In the vehicle Ve shown in FIG. 3, a drive torque generated by the prime mover 1 is delivered to the drive wheels 2 to establish a driving force to propel the vehicle Ve. Specifically, the drive wheels 2 is connected to the prime mover 1 through a transmission 7, a differential gear unit 8, and driveshafts 9. That is, the vehicle Ve shown in FIG. 1 is a front-drive layout vehicle in which the drive torque is delivered to a pair of front wheels to establish the driving force by the front wheels. Instead, the vehicle control system according to the preferred embodiment of the present disclosure may also be applied to a rear-drive layout vehicle in which the drive torque is delivered to a pair of rear wheels through a propeller shaft (not shown) to establish the driving force by the rear wheels. Further, the vehicle control system according to the preferred embodiment of the present disclosure may also be applied to and a four-wheel drive layout vehicle in which the drive torque is delivered to both front and rear wheels to establish the driving force by all wheels.

The vehicle Ve is accelerated by manipulating the accelerator pedal 3. Given that the internal combustion engine is adopted as the prime mover 1, an opening degree of a throttle valve of the gasoline engine or a fuel injection to the diesel engine is increased with an increase in an operating amount (i.e., a depression) of the accelerator pedal 3 to increase the drive torque, and as a result, a driving force to propel the vehicle Ve is increased. By contrast, the opening degree of the throttle valve is reduced to reduce the drive torque by returning the accelerator pedal 3, and as a result, the driving force to propel the vehicle Ve is reduced. In addition, a braking force to decelerate the vehicle Ve is increased with a reduction in the driving force. Specifically, an engine braking force derived from a friction torque and a pumping loss counteracting the drive torque is established by returning the accelerator pedal 3. Otherwise, given that the electric motor is adopted as the prime mover 1, the electric motor serves as a brake to establish a regenerative braking force when the accelerator pedal 3 is returned.

Thus, the driving force and the braking force are changed by manipulating the accelerator pedal 3. In order to detect an operating amount and an operating speed of the accelerator pedal 3, the vehicle Ve is provided with an accelerator sensor 5a. Specifically, an opening degree of the throttle valve governed by a position of the accelerator pedal 3 is detected by the accelerator sensor 5a. In addition, an operating condition and an operating direction of the accelerator pedal 3 may also be obtained based on an operating speed of the accelerator pedal 3 detected by the accelerator sensor 5a. That is, it is possible to determine whether the accelerator pedal 3 is being depressed or returned by a driver. According to the exemplary embodiment of the present disclosure, the accelerator pedal 3 is provided with a pedal force sensor 5b and a pressure sensor 5g.

Figure 4:
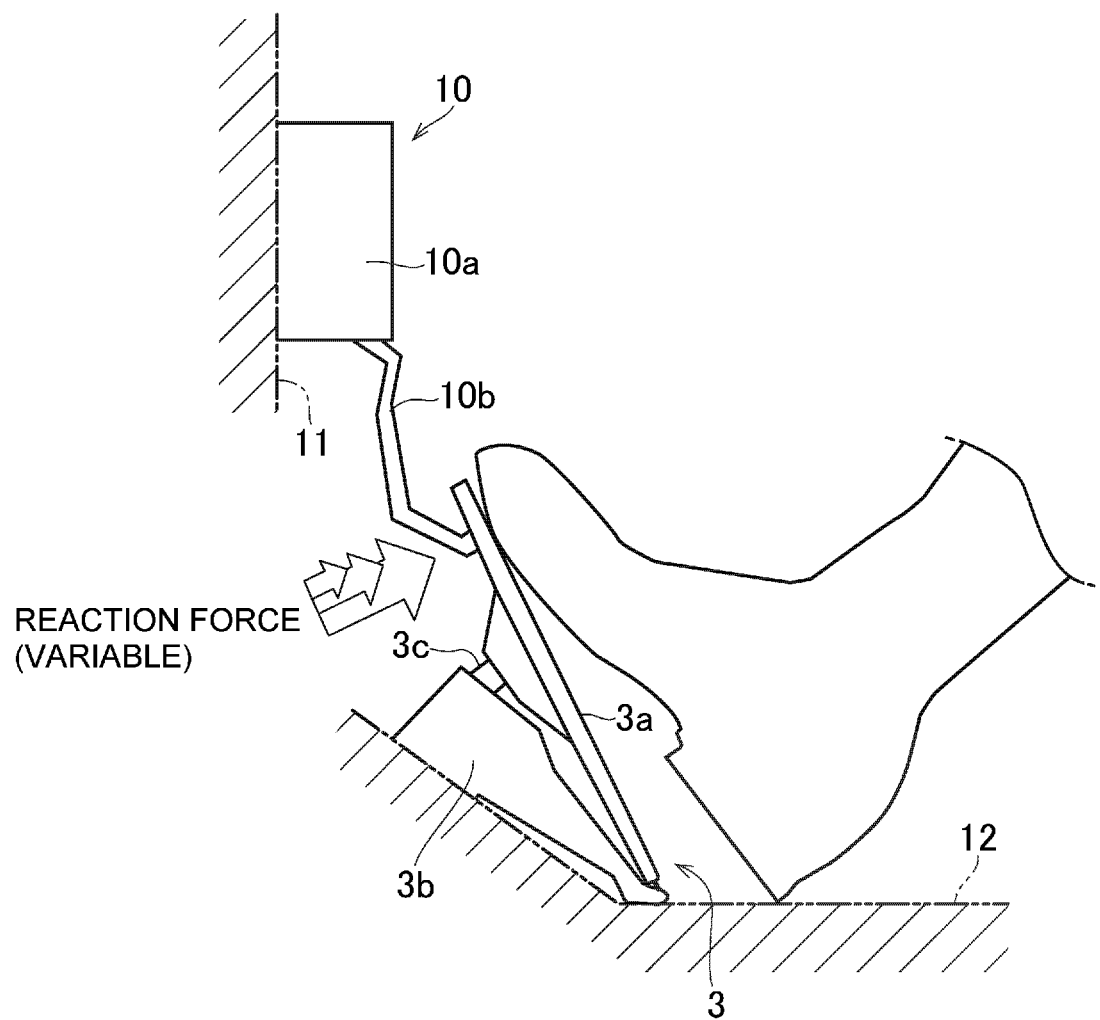
FIG. 4 is a schematic illustration showing a first example of an accelerator pedal assembly.

In order to control a reaction force (or a pedal load) counteracting a pedal force applied to the accelerator pedal 3, according to the exemplary embodiment of the present disclosure, the accelerator pedal 3 is provided with an actuator 10. Turning to FIG. 4, there is shown a first example of a structure of the accelerator pedal 3. As illustrated in FIG. 4, the actuator 10 comprises a reaction force generator 10a attached to a dash panel 11, and a rod 10b. For example, an electric actuator or a hydraulic actuator may be adopted as the actuator 10, and a reaction force established by the actuator 10 is transmitted to a bottom surface of the accelerator pedal 3 through the rod 10b. According to the example shown in FIG. 4, the accelerator pedal 3 as a standing pedal is arranged on a floor panel 12. Specifically, the accelerator pedal 3 comprises a pedal 3a, a sensor 3b, and a rod 3c. The sensor 3b includes the above-mentioned accelerator sensor 5a and the pedal force sensor 5b, and the sensor 3b is provided with a return spring (not shown) that establishes a reaction force applied to the accelerator pedal 3. Specifically, an energizing force established by the return spring is transmitted to the pedal 3a through the rod 3c to serve as a reaction force. Thus, in the actuator 10 according to the example shown in FIG. 4, the reaction force generator 10a of the actuator 10 is formed separately from the pedal assembly including the pedal 3a and the sensor 3b.

Figure 5:
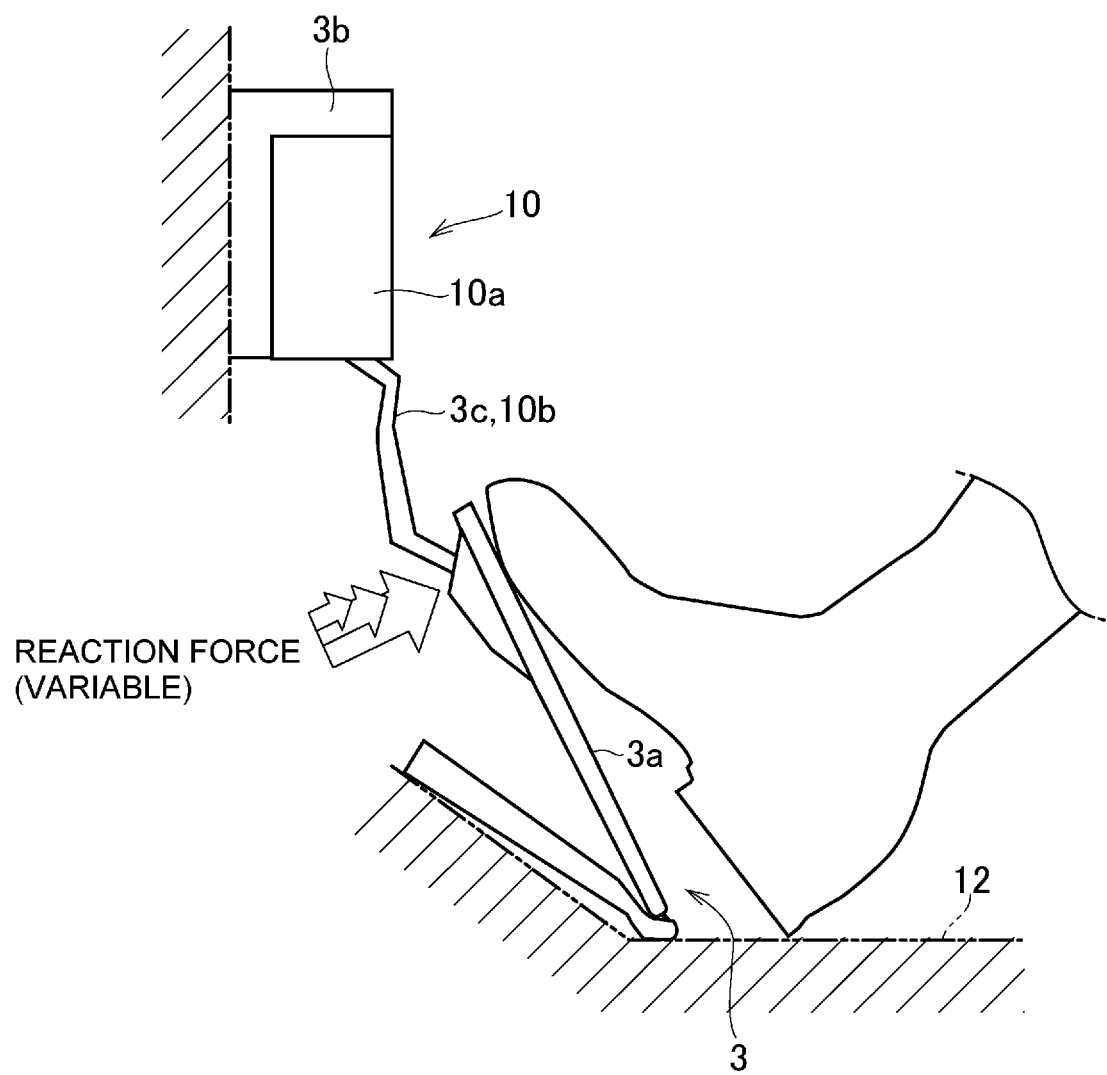
FIG. 5 is a schematic illustration showing a second example of the accelerator pedal assembly.

The structure of the actuator 10 should not be limited to the example shown in FIG. 4. Turning to FIG. 5, there is shown a second example of a structure of the accelerator pedal 3. According to the example shown in FIG. 5, the sensor 3b is integrated with the reaction force generator 10a of the actuator 10, or held in a casing (not shown) together with the reaction force generator 10a. On the other hand, the pedal 3a of the accelerator pedal 3 as a standing pedal is arranged on the floor panel 12 separately from the actuator 10. According to the example shown in FIG. 5, the rod 3c of the accelerator pedal 3 is formed integrally with the rod 10b of the actuator 10.

Figure 6:
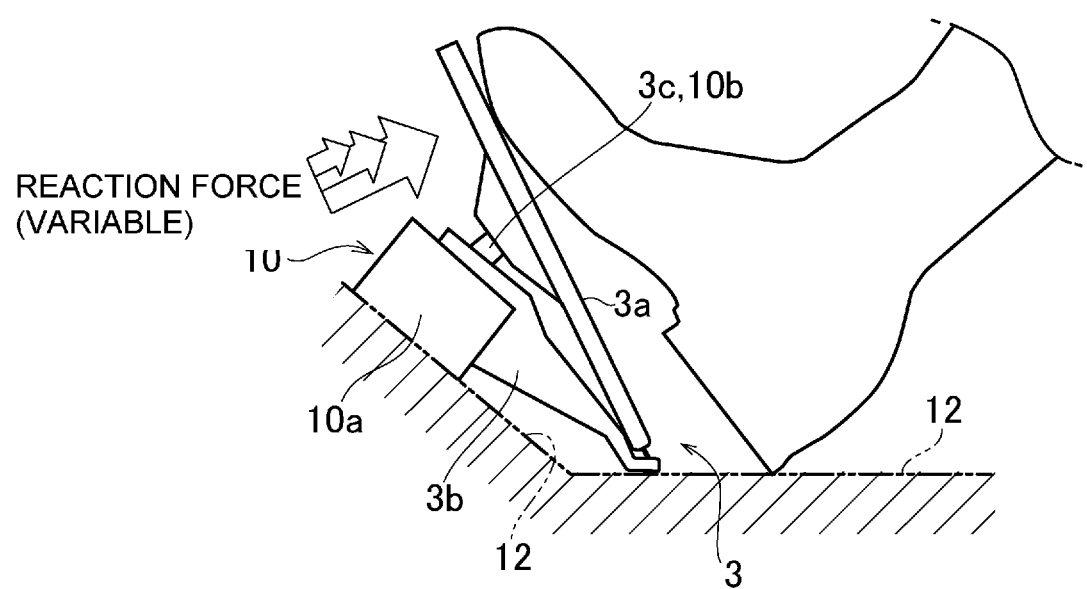
FIG. 6 is a schematic illustration showing a third example of the accelerator pedal assembly.

Turning to FIG. 6, there is shown a third example of a structure of the accelerator pedal 3. According to the example shown in FIG. 6, the reaction force generator 10a is integrated with the pedal 3a and the sensor 3b of the accelerator pedal 3 as a standing pedal arranged on the floor panel 12, and a unit of the reaction force generator 10a, the pedal 3a and the sensor 3b may be held in a casing (not shown). In this case, the rod 3c of the accelerator pedal 3 is also formed integrally with the rod 10b of the actuator 10, and the actuator 10 is placed on the floor panel 12.

Figure 7:
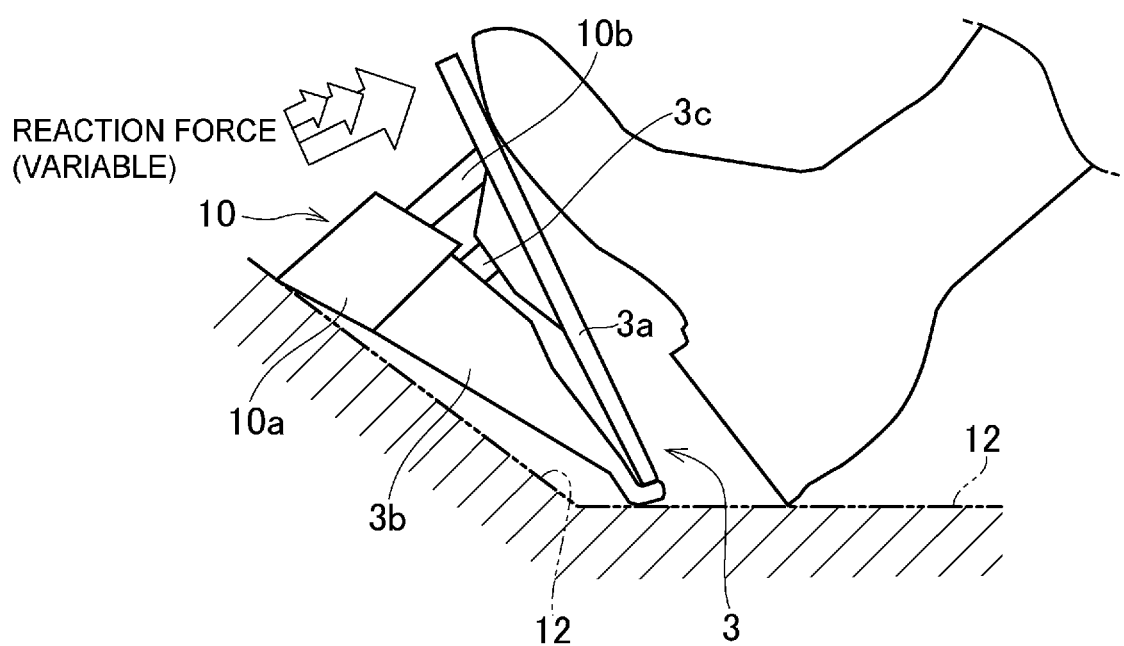
FIG. 7 is a schematic illustration showing a fourth example of the accelerator pedal assembly.

Turning to FIG. 7, there is shown a fourth example of a structure of the accelerator pedal 3. In the example shown in FIG. 7, the reaction force generator 10a of the actuator 10 placed on the floor panel 12 is also integrated with the pedal 3a and the sensor 3b of the accelerator pedal 3 as a standing pedal arranged on the floor panel 12, and a unit of the reaction force generator 10a, the pedal 3a and the sensor 3b may also be held in a casing (not shown). According to the example shown in FIG. 7, the pedal 3a is connected to the sensor 3b through the rod 3c and to the reaction force generator 10a through the rod 10b.

Figure 8:
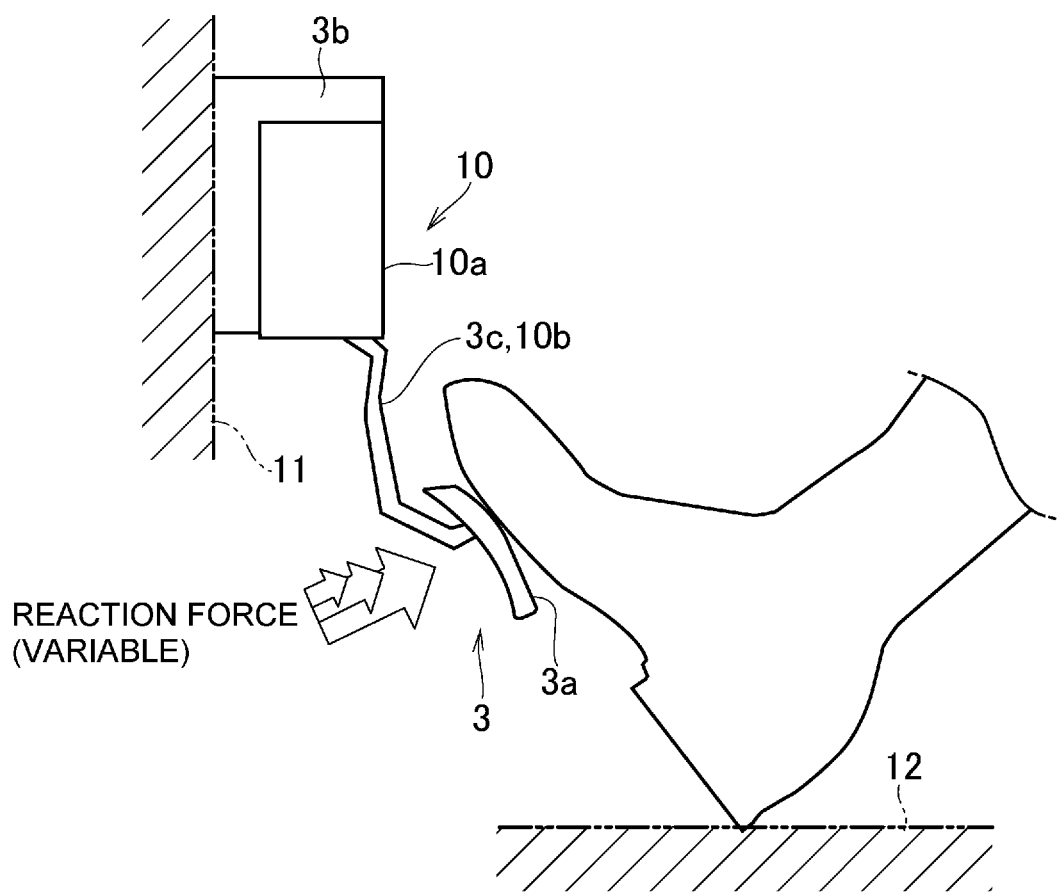
FIG. 8 is a schematic illustration showing a fifth example of the accelerator pedal assembly.

Turning to FIG. 8, there is shown a fifth example of a structure of the accelerator pedal 3. According to the example shown in FIG. 8, a suspended pedal assembly is employed as the accelerator pedal 3. Specifically, the sensor 3b is integrated with the reaction force generator 10a of the actuator 10 or held in a casing (not shown) together with the reaction force generator 10a, and the sensor 3b and the actuator 10 are attached to the dash panel 11. In the example shown in FIG. 8, the pedal 3a is suspended from the actuator 10 through a common rod serving as the rod 3c of the accelerator pedal 3 and the rod 10b of the actuator 10. Thus, according to the exemplary embodiment of the present disclosure, the reaction force is applied to the pedal 3a from the actuator 10, and the control system according to the exemplary embodiment of the present disclosure may be applied not only to the standing pedal but also to the suspended pedal to control the reaction force applied to the pedal 3a.

Turning back to FIG. 3, in the vehicle Ve, the seat 4 is arranged in front of a steering wheel (not shown) and the accelerator pedal 3. As will be described later, according to the exemplary embodiment of the present disclosure, the control system is configured to estimate a stress on the ankle and the leg of the driver sitting on the seat 4 based on a posture of the driver. To this end, a seat position sensor 5c and a seat sensor 5d are arranged in the seat 4.

The detector 5 includes a power source, a microcomputer, various kinds of sensors, an input-output interface and so on, and the detector 5 collects various kinds of data and information to control the vehicle Ve. According to the exemplary embodiment of the present disclosure, the detector 5 comprises: the accelerator sensor 5a that detects a position of the accelerator pedal 3 (i.e., an opening degree of the throttle valve); the pedal force sensor 5b that detects a pedal force applied to the pedal 3a from the driver (i.e., a depressing load); the seat position sensor 5c that detects positions of movable members of the seat 4 (i.e., a position of the seat 4); a seat sensor 5d that detects occupancy of the seat 4, and a position and a posture of the driver sitting on the seat 4; a wheel speed sensor 5e that detects a rotational speed of each wheel; an acceleration sensor 5f that detects a that detects at least a longitudinal acceleration of the vehicle Ve; the pressure sensor 5g that detects a depression of the accelerator pedal 3 and a size of the foot of the driver; and an image recognition camera 5h that records a body shape and a posture of the driver sitting on the seat 4. As an option, a thermography camera, and a human detecting sensor utilizing infrared ray, visible ray, ultrasonic or the like (neither of which are shown) may be arrange in the vehicle Ve. The detector 5 is electrically connected to the controller 6 so that detection values obtained by those sensors and calculation values calculated by those devices are transmitted to the controller 6 in the form of electric signal.

The controller 6 comprises a microcomputer as its main constituent, and for example, the prime mover 1, the transmission 7, the actuator 10 and so on are controlled by the controller 6. The controller 6 performs calculation using the incident data transmitted from the detector 5, and data and formulas or the like stored in advance. Calculation results are transmitted from the controller 6 to the prime mover 1, the transmission 7, the actuator 10 and so on in the form of command signal.

Specifically, the controller 6 calculates a target driving force (or a target drive torque) to be generated by the prime mover 1 based on an operating amount of the accelerator pedal 3 detected by the accelerator sensor 5a and a speed of the vehicle Ve calculated based on speeds of the wheels detected by the wheel speed sensor 5e, and an output power of the prime mover 1 is controlled based on the target driving force calculated by the controller 6. A speed ratio (or a gear stage) of the transmission 7 is also controlled by the controller 6. Further, the controller 6 estimates a posture of the driver sitting on the seat 4 based on detection values of e.g., the pedal force sensor 5b and the seat position sensor 5c, and estimates a stress on the ankle of the driver based on the estimated posture of the driver. As explained later, the controller 6 selects a property of the driving force from a first driving force property and a second driving force property based on the estimated stress on the ankle of the driver. Although only one controller 6 is depicted in FIG. 3, a plurality of controllers may be arranged in the vehicle Ve to control the specific devices individually.

As described, the objective of the present disclosure is to reduce physical stress on a driver to operate an accelerator pedal without reducing acceleration feel. To this end, the controller 6 comprises an acceleration feel maintainer that executes routines shown in FIGS. 9 and 15.

Figure 9:
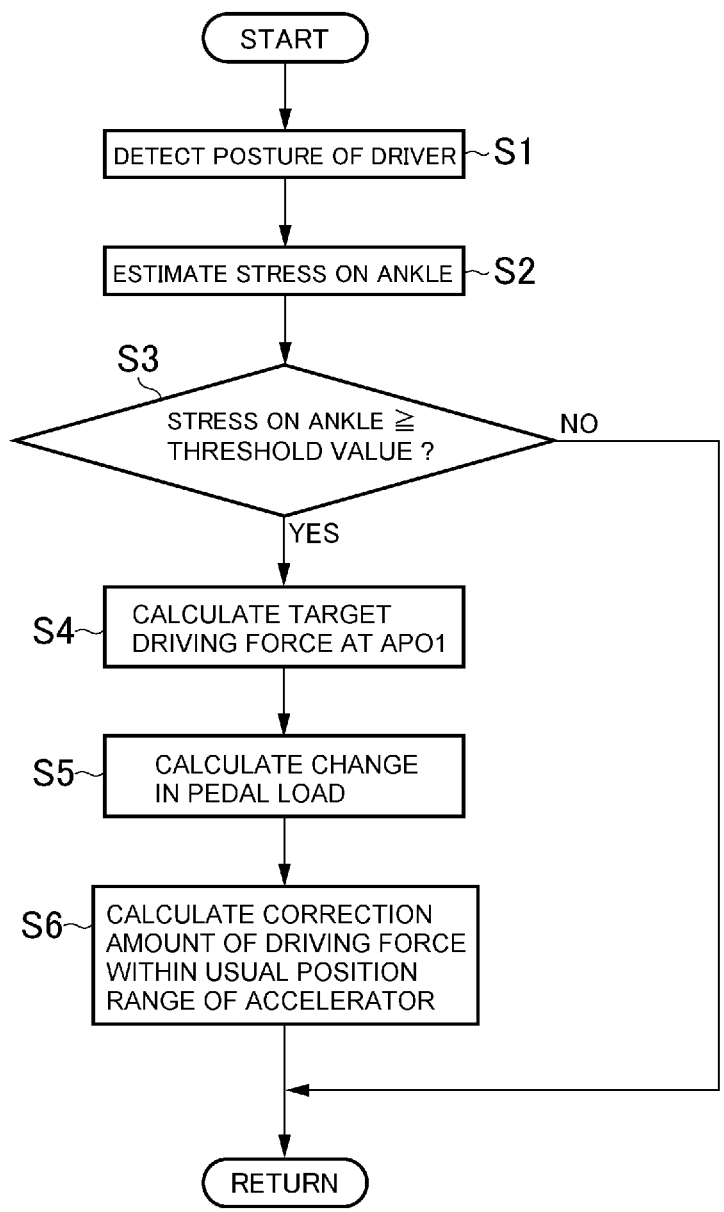
FIG. 9 is a flow chart showing one example of a routine to be executed by the control system according to the exemplary embodiment of the present disclosure.

Here will be explained one example of the routine executed by the control system according to the exemplary embodiment of the present disclosure with reference to FIG. 9. According to the example shown in FIG. 9, a difference between: a ratio of acceleration of the vehicle Ve to a pedal force when the first driving force property is selected; and a ratio of acceleration of the vehicle Ve to a pedal force when the second driving force property is selected, is reduced by increasing a ratio of increase in a target driving force based on the second driving force property to an increase in depression of the accelerator pedal.

At step S1, a posture of the driver sitting on the seat 4 is detected. For example, a posture of the driver, a body shape of the driver, a position on the seat 4, a seat position, a size of the foot and so on are detected at step S1.

At step S2, a magnitude of stress on the ankle of the driver depressing the accelerator pedal 3 is estimated. According to the exemplary embodiment of the present disclosure, a definition of the "stress on the ankle" includes stresses on calf muscles and thigh muscles. In general, drivers operate accelerator pedals while placing his/her heels on floors and placing his/her soles on the pedals. For example, when a depression of the accelerator pedal is shallow, a foot angle between the foot and a shin is small (or narrow). In this case, stresses on the ankle and muscles of the calf and the thigh would be increased compared to a case of depressing the accelerator pedal deeply. At step S2, therefore, the above-mentioned foot angle of the driver is calculated based on the data collected at step S1, and the stress on the ankle of the driver is estimated based on the calculated foot angle. That is, the stress on the ankle of the driver is estimated in a quantitative manner.

At step S3, it is determined whether the stress on the ankle of the driver estimated at step S2 is equal to or greater than a predetermined correction threshold. As described, the property of the driving force is selected from the first driving force property and the second driving force property based on the estimated stress on the ankle of the driver. Specifically, when the first driving force property as a standard property is selected, a target driving force with respect to a position of the accelerator pedal 3 is set to a standard value. Whereas, when the second driving force property as a corrected property is selected, the target driving force with respect to a position of the accelerator pedal 3 is corrected to be reduced compared to the target driving force set based on the first driving force property. For example, the first driving force property is selected in the normal situation and in the beginning of propulsion of the vehicle Ve. In those situations, the stress on the ankle of the driver is bearable and less than the correction threshold. That is, it is not necessary to correct the driving force property, and hence the first driving force property is selected in those situations. By contrast, when the stress on the ankle of the driver exceeds the correction threshold, it is necessary to correct the target driving force property from the first driving force property to the second driving force property.

Figure 10:
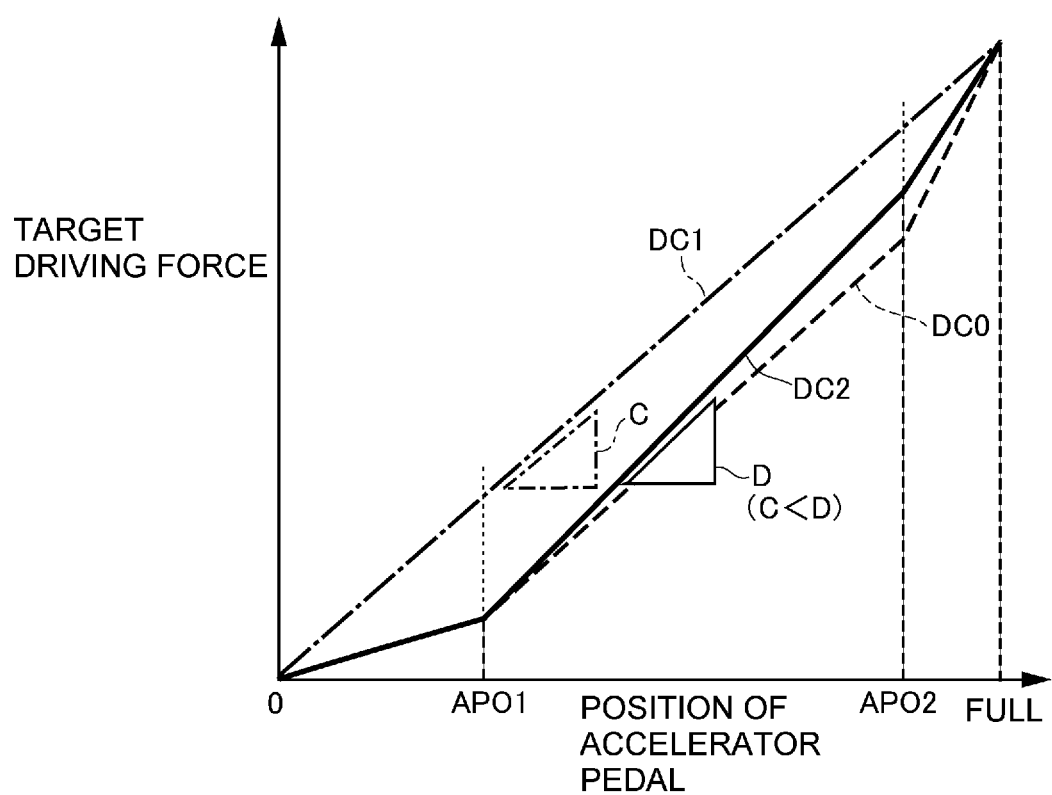
FIG. 10 is a map determining a target driving force with respect to a position of the accelerator pedal based on the first driving force property or the second driving force property during execution of the routine shown in FIG. 9.

When the second driving force property is selected, specifically, the target driving force is set in such a manner as to reduce a physical stress on the ankle of the driver within a usual position range of the accelerator pedal 3. As indicated in FIG. 10, the usual position range of the accelerator pedal 3 is defined between a first position APO1 which is deeper than an initial position (indicated as 0 in FIG. 10) and a second position APO2 which is near the bottom of the accelerator pedal 3 (indicated as "FULL" in FIG. 10). In FIG. 10, the dashed-dotted line DC1 indicates the target driving force set based on the first driving force property, the solid line DC2 indicates the target driving force set based on the second driving force property, and the dashed line CO indicates the target driving force set based on a conventional property.

If the stress on the ankle of the driver is less than the correction threshold so that the answer of step S3 is NO, it is not necessary to correct the driving force property, and hence the routine returns. By contrast, if the stress on the ankle of the driver is equal to or greater than the correction threshold so that the answer of step S3 is YES, it is necessary to correct the driving force property. In this case, the routine progresses to step S4.

At step S4, a target driving force with respect to the first position APO1 of the accelerator pedal 3 is calculated. As described, the first position APO1 is a starting (i.e., a shallowest) position of the usual position range of the accelerator pedal 3 in the current driving condition. That is, at step S4, a minimum target driving force possible to reduce the stress on the ankle is calculated based on the second driving force property. In this case, accordingly, the target driving force with respect to the first position APO1 calculated based on the second control property is reduced compared to the target driving force with respect to the first position APO1 that is supposed to be calculated based on the first driving force property. Such minimum target driving force possible to reduce the stress on the ankle may be obtained by conventional manners. For example, the minimum target driving force possible to reduce the stress on the ankle may be set based on a result of experiment or simulation. As will be described later, according to the exemplary embodiment of the present disclosure, the target driving force is changed based on the second driving force property from the first position APO1.

Figure 11:
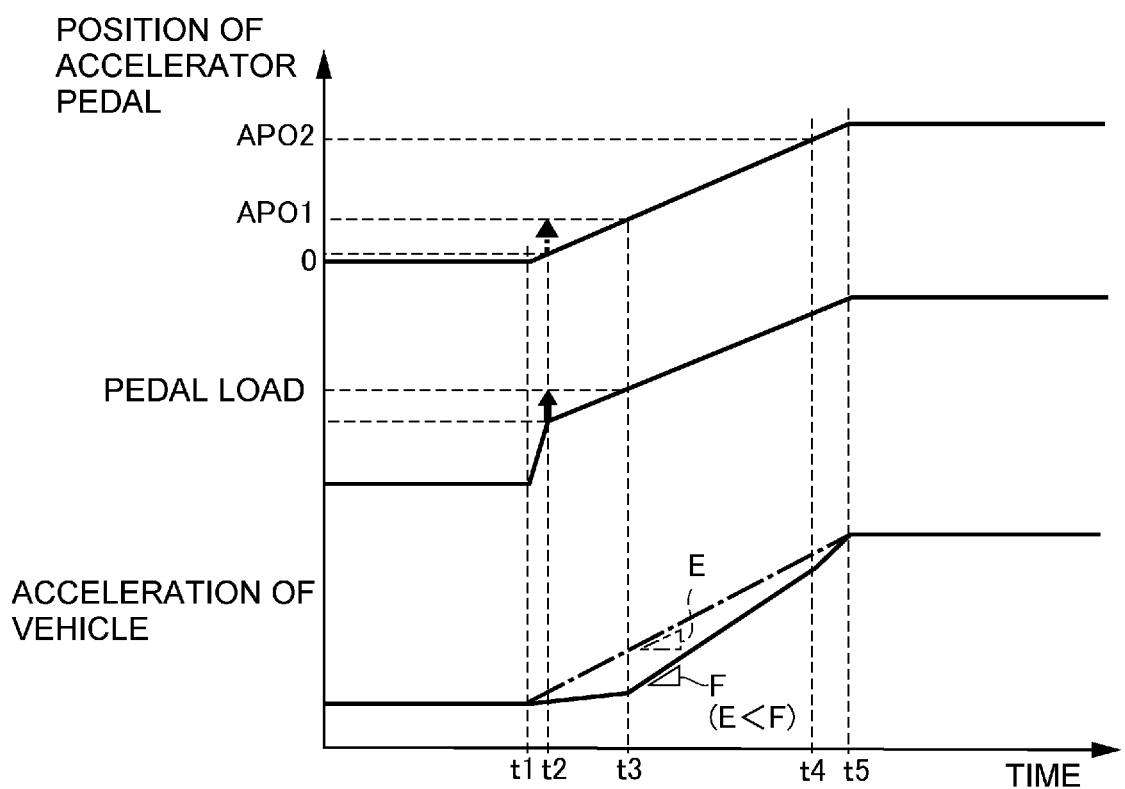
FIG. 11 is a time chart showing temporal changes in a pedal load and an acceleration of the vehicle with respect to a position of the accelerator pedal, during execution of the routine shown in FIG. 9.

At step S5, an amount of change in the reaction force of the accelerator pedal 3 (also referred to as the "pedal load") counteracting the pedal force applied to the accelerator pedal 3 from the foot of the driver is calculated. Specifically, the pedal load is changed if the property of the driving force is shifted from the first driving force property to the second driving force property, and such change in the pedal load may be sensed by the driver. Turning to FIG. 11, there is shown a temporal change in the pedal load when depressing the accelerator pedal 3 from the initial position to the bottom during execution of the routine shown in FIG. 9. In the example shown in FIG. 11, the accelerator pedal 3 is depressed at point t1. Consequently, the pedal load starts increasing sharply from point t1, and further increases at a milder rate from point t2 as the accelerator pedal 3 is further depressed. Eventually, the accelerator pedal 3 is fully depressed at point t5, and the pedal load is stabilized. As a result of shifting the property of the driving force from the first driving force property to the second driving force property, the position range of the accelerator pedal 3 between the first position APO1 and the second position APO2 is set as the usual position range of the accelerator pedal 3 in the current running condition. When the target driving force is reduced based on the second driving force property, as indicated by the upward arrow in FIG. 11, the usual position range of the accelerator pedal 3 is shifted to the deeper range compared to the case of setting the target driving force based on the first driving force property. Consequently, as also indicated by the upward arrow in FIG. 11, the pedal load is increased within the usual position range of the accelerator pedal 3. At step S5, therefore, a difference between the pedal load before increased and the pedal load at the first position APO1 after increased is calculated. Specifically, the amount of change in the pedal load is calculated by calculating an increase in the pedal load within a period from point t2 at which the accelerator pedal 3 is depressed to a predetermined usual position to point t3 at which the accelerator pedal 3 is depressed to the first position APO1.

At step S6, a correction amount of the driving force within the usual position range of the accelerator pedal 3 is calculated, and the driving force property of the vehicle Ve is corrected. That is, the driving force correcting control is executed so that the property of the driving force is corrected from the first driving force property to the second driving force property. Consequently, as described, the target driving force with respect to a position of the accelerator pedal 3 is reduced compared to the target driving force set based on the first driving force property. In addition, the second driving force property is set so as to reduce a difference between: a ratio of acceleration of the vehicle Ve established by applying a pedal force to the accelerator pedal 3 from the driver to the pedal force given that the first driving force property is selected; and a ratio of acceleration of the vehicle Ve established by applying a pedal force to the accelerator pedal 3 from the driver to the pedal force given that the second driving force property is selected. That is, the correction amount of the driving force within the usual position range of the accelerator pedal 3 is calculated.

Specifically, the second driving force property is set within the usual position range such that a ratio of increase in the target driving force to an increase in depression of the accelerator pedal 3 given that the second driving force property is selected (indicated as an inclination D of the solid line DC2 in FIG. 10) is increased greater than a ratio of increase in the target driving force to an increase in depression of the accelerator pedal 3 given that the first driving force property is selected (indicated as an inclination C of the dashed-dotted line DC1 in FIG. 10).

Figure 12:
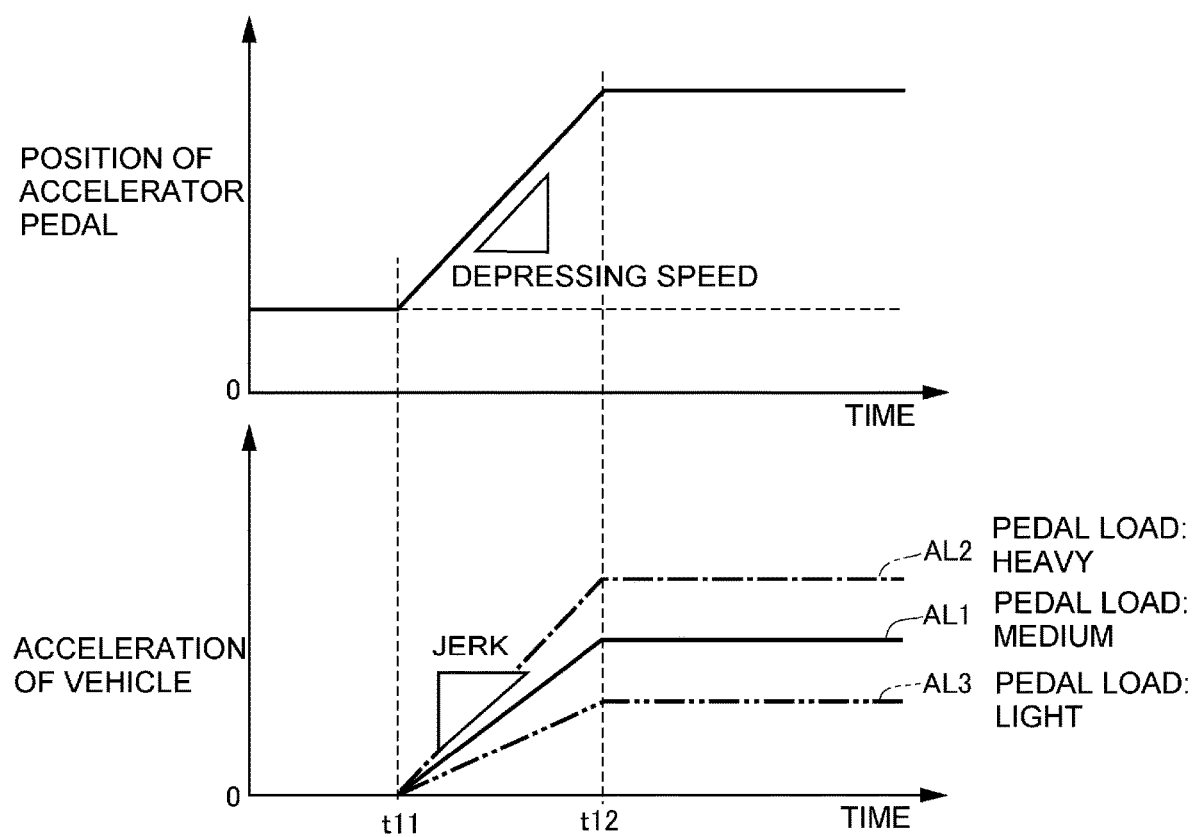
FIG. 12 is a is a time chart showing a change in jerk in accordance with the pedal load.

For example, the correction amount of the driving force within the usual position range of the accelerator pedal 3 may be calculated using a jerk of the vehicle Ve as a change rate of the longitudinal acceleration that is changed in accordance with a change in a position of the accelerator pedal 3. Specifically, the acceleration of the vehicle Ve is changed by operating the accelerator pedal 3, and the jerk of the vehicle Ve is changed in accordance with a depressing speed of the accelerator pedal 3. A natural jerk by which the driver is allowed to operate the accelerator pedal 3 in a stress-free condition is changed depending on the pedal load sensed by the driver. FIG. 12 is a time chart showing a temporal change in the jerk when depressing the accelerator pedal 3. In FIG. 12, the solid line AL1 indicates a change in the acceleration with respect to a depressing speed of the accelerator pedal 3 in a case that the pedal load of the accelerator pedal 3 is moderate. In this case, the above-mentioned natural jerk is indicated as an inclination of the solid line AL1 between point t11 and point t12. In FIG. 12, the dashed-dotted line AL2 indicates a change in the acceleration with respect to a depressing speed of the accelerator pedal 3 in a case that the pedal load of the accelerator pedal 3 is standard. In this case, the above-mentioned natural jerk is indicated as an inclination of the dashed-dotted line AL2 between point t11 and point t12. In FIG. 12, the dashed-two-dotted line AL3 indicates a change in the acceleration with respect to a depressing speed of the accelerator pedal 3 in a case that the pedal load of the accelerator pedal 3 is lighter than the moderate load. In this case, the above-mentioned natural jerk is indicated as an inclination of the dashed-two-dotted line AL3 between point t11 and point t12. As can be seen from FIG. 12, the natural jerk by which the driver is allowed to operate the accelerator pedal 3 in a stress-free condition is increased with an increase in the pedal load sensed by the driver. That is, in the case that the pedal load of the accelerator pedal 3 is greater than a standard magnitude, the natural acceleration feel may be realized by setting the property of the driving force (i.e., acceleration) in such a manner that the jerk is increased greater than a standard magnitude. By contrast, in the case that the pedal load of the accelerator pedal 3 is less than the standard magnitude, the natural acceleration feel may be realized by setting the property of the driving force (i.e., acceleration) in such a manner that the jerk is reduced less than the standard magnitude.

Figure 13:
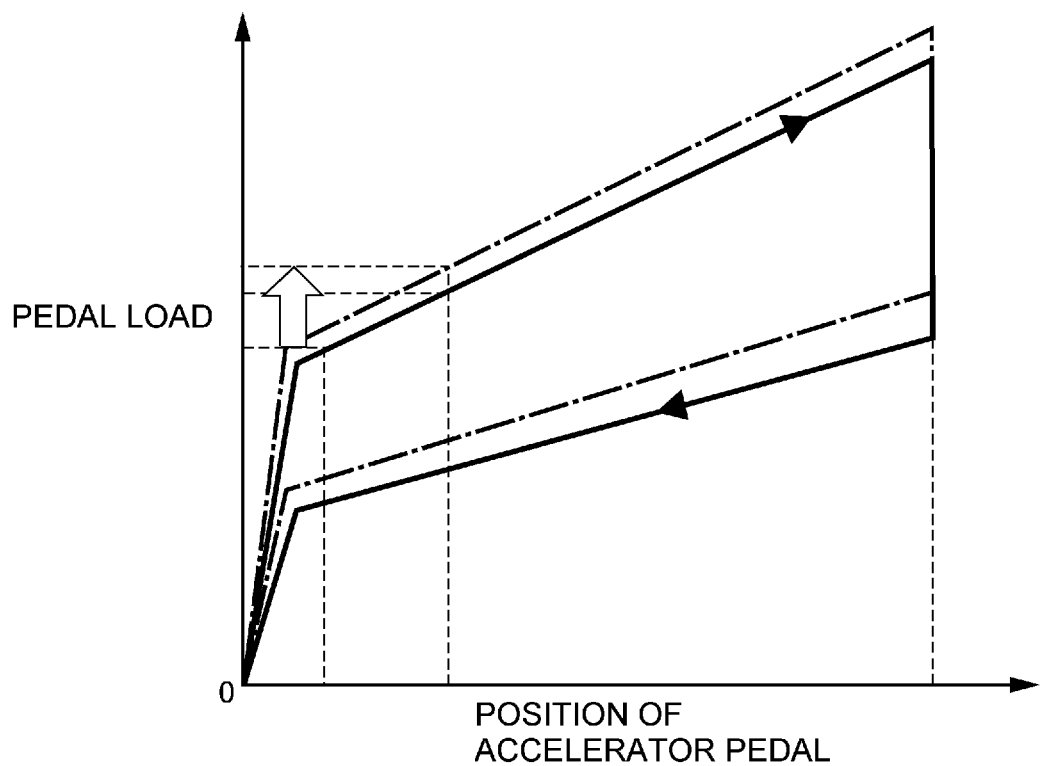
FIG. 13 is a graph showing a change in pedal load with respect to a position of the accelerator pedal in a case that a foot of the driver is small.

At step S6, therefore, the correction amount of the driving force within the usual position range of the accelerator pedal 3 is calculated taking account of the pedal load sensed by the driver such that the jerk is adjusted to the above-mentioned natural jerk. Here, the pedal load sensed by the driver also changes depending on a size of the foot and a body shape of the driver. FIG. 13 shows a change in the pedal load with respect to a position of the accelerator pedal. In FIG. 13, the dashed-dotted line indicates a change in the pedal load with respect to a position of the accelerator pedal in a case that a frame of the driver is slight and that a size of the foot is small. For example, in the case that the foot of the driver is smaller than a standard size, the pedal force is applied to the accelerator pedal 3 at a point closer to a heel point compared to that of a case in which a size of the foot is standard or larger. In other words, in the case that the foot of the driver is smaller than a standard size, a distance between a point of application of the pedal force and the heel point is shorter than that of the case in which a size of the foot is standard or larger, and consequently, the pedal load sensed by the driver is increased as indicated by the dashed-dotted line in FIG. 13. According to the exemplary embodiment of the present disclosure, therefore, the control system is configured to calculate the correction amount of the driving force within the usual position range of the accelerator pedal 3 also taking account of a body shape of the driver and a size of the foot of the driver, so as to adjust the jerk to the above-mentioned natural jerk.

As a result of setting the second driving force property based on the correction amount of the driving force within the usual position range of the accelerator pedal 3 thus calculated, the jerk generated within the usual position range of the accelerator pedal 3 is changed. Turning back to FIG. 11, there are shown the jerks within the usual position range of the accelerator pedal 3 in both cases in which the first driving force property is selected and in which the second driving force property is selected. In FIG. 11, specifically, an inclination E of the dashed-dotted line between point t3 and point t4 indicates the jerk within the usual position range of the accelerator pedal 3 being depressed, in the case that the first driving force property is selected. Whereas, an inclination F of the solid line indicates the jerk of the case in which the second driving force property is selected. As can be seen from FIG. 11, the inclination F of the solid line is steeper than the inclination E of the dashed-dotted line. That is, the jerk of the case in which the second driving force property is selected is greater than the jerk of the case in which the first driving force property is selected.

In the example shown in FIG. 11, the accelerator pedal 3 is depressed to the first position APO1 as a starting position of the usual position range of the accelerator pedal 3 at point t3, and the target driving force with respect to the first position APO1 is calculated based on the second control property from point t3. Consequently, as indicated in FIG. 11, the target driving force with respect to the first position APO1 is reduced less than the target driving force with respect to the first position APO1 calculated based on the first driving force property. In this situation, therefore, the driver will apply a stronger pedal force to the accelerator pedal 3 within the usual position range thereby depressing the accelerator pedal 3 deeper to achieve a desired driving force, compared to the case in which the target driving force is calculated based on the first driving force property. For this reason, the driver does not have to keep the foot angle to a narrow angle to operate the accelerator pedal 3 within the usual position range. That is, a foot angle may be maintained wider to operate the accelerator pedal 3 within the usual position range so that the stress on the ankle of the driver is reduced.

As a result of reducing the target driving force based on the second driving force property at point t3, the acceleration of the vehicle Ve at point t3 is reduced. Nonetheless, the jerk of the case in which the second driving force property is selected is greater than the jerk of the case in which the first driving force property is selected. Therefore, the acceleration reduced based on the second driving force property is increased sharply from point t3. Consequently, a difference between the actual acceleration reduced based on the second driving force property and an acceleration supposed to be achieved based on the first driving force property is reduced gradually from point t3. Thereafter, depression of the accelerator pedal 3 exceeds the second position APO2 at point t4, that is, the accelerator pedal 3 is depressed deeper than the usual position range at point t4. Eventually, when the accelerator pedal 3 is fully depressed at point t5, the actual acceleration is increased to the same level as the acceleration supposed to be achieved based on the first driving force property. Thus, in the case that the second driving force property is selected, a magnitude of the jerk is changed before and after point t5. However, a difference between the jerk before point t5 and the jerk after point t5 is smaller than that according to the conventional art in which the jerk will not be changed between the first driving force property and the second driving force property. According to the exemplary embodiment of the present disclosure, therefore, the acceleration of the vehicle Ve will not be changed significantly by the above-explained change in the jerk when the depression of the accelerator pedal 3 exceeds the usual position range. For this reason, uncomfortable feeling due to change in acceleration may be reduced.

After correcting the property of the driving force at step S6, the routine returns.

Figure 14:
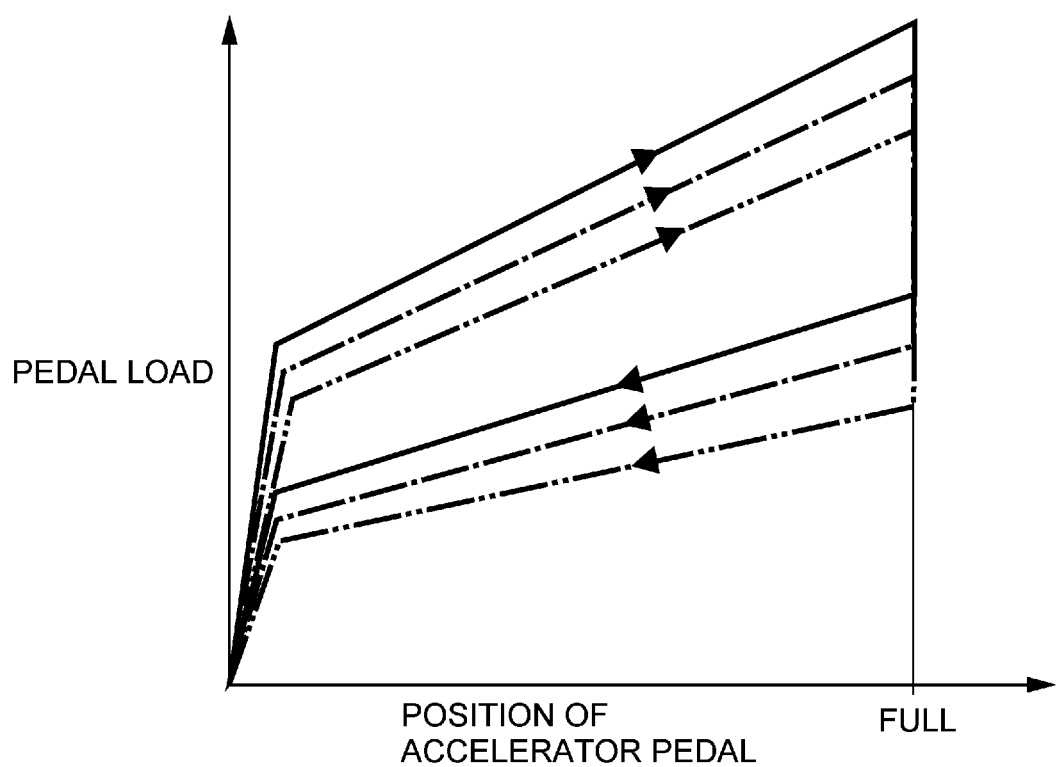
FIG. 14 is a graph showing pedal loads with respect to a position of the accelerator pedal changed by an actuator.

Next, here will be explained another example of the routine executed by the control system according to the exemplary embodiment of the present disclosure with reference to FIGS. 14 to 17. As described, the accelerator pedal 3 is provided with the actuator 10 that controls the pedal load of the accelerator pedal 3. Therefore, as indicated in FIG. 14, the pedal load as the reaction force of the accelerator pedal 3 counteracting the pedal force applied to the accelerator pedal 3 may be changed arbitrarily by the actuator 10.

Figure 15:
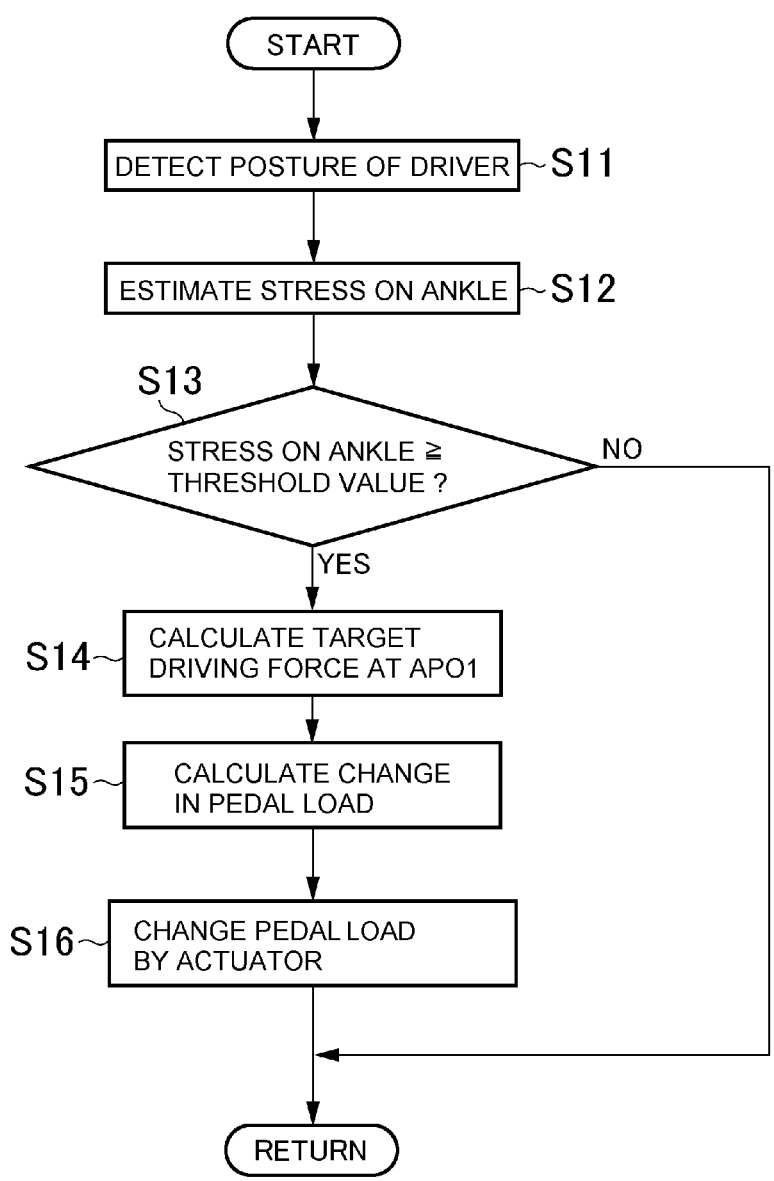
FIG. 15 is a flow chart showing another example of the routine to be executed by the control system according to the exemplary embodiment of the present disclosure.

Turning to FIG. 15, there is shown another example of the routine executed by the control system according to the exemplary embodiment of the present disclosure. According to the example shown in FIG. 15, the difference between: the ratio of acceleration of the vehicle Ve to the pedal force when the first driving force property is selected; and the ratio of acceleration of the vehicle Ve to the pedal force when the second driving force property is selected, is reduced by reducing the pedal load of the accelerator pedal 3 by the actuator 10. In the routine shown in FIG. 15, contents of steps S11 to S15 are identical to those of steps S1 to S5 in the routine shown in FIG. 9, respectively.

In the routine shown in FIG. 15, at step S16, the pedal load of the accelerator pedal 3 is changed by the actuator 10. Specifically, the target driving force with respect to a position of the accelerator pedal 3 is reduced based on the second driving force property compared to the target driving force set based on the first driving force property. In addition, the pedal load of the accelerator pedal 3 is reduced so as to reduce the difference between: the ratio of acceleration of the vehicle Ve established by applying a pedal force to the accelerator pedal 3 from the driver to the pedal force given that the first driving force property is selected; and the ratio of acceleration of the vehicle Ve established by applying a pedal force to the accelerator pedal 3 from the driver to the pedal force given that the second driving force property is selected.

Figure 16:
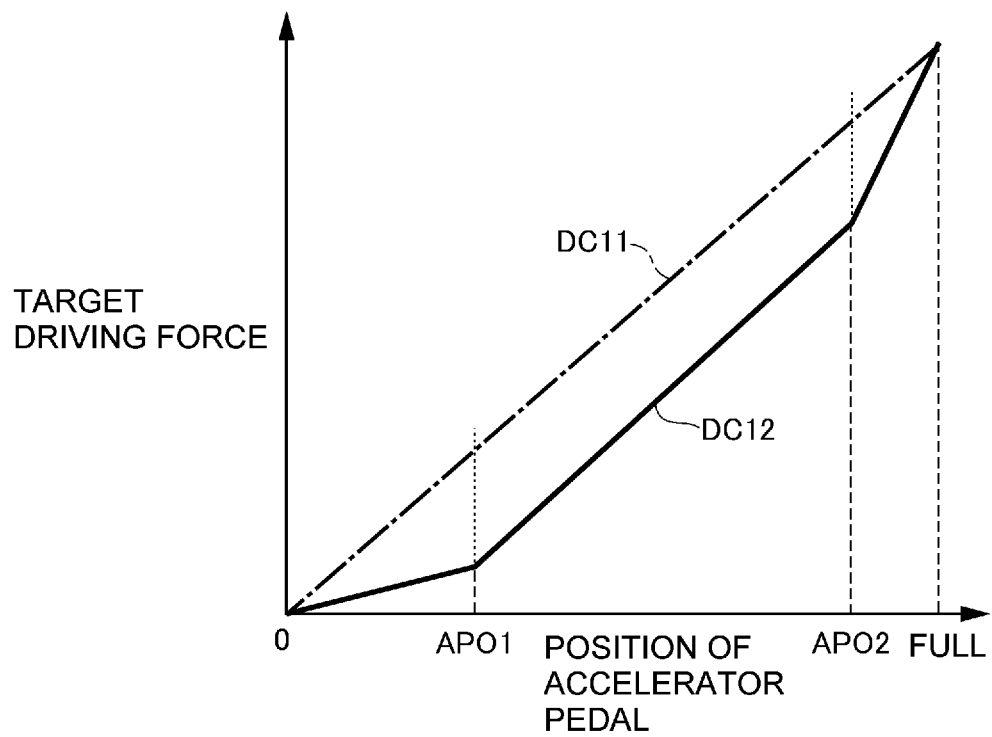
FIG. 16 is a map determining a target driving force with respect to a position of the accelerator pedal based on the first driving force property or the second driving force property during execution of the routine shown in FIG. 15.

Specifically, the second driving force property is set within the usual position range such that the target driving force with respect to a position of the accelerator pedal 3 is reduced. According to another example, first of all, a target driving force with respect to the first position APO1 of the accelerator pedal 3 is calculated. As described, the target driving force at the first position APO1 calculated based on the second driving force property is the minimum target driving force possible to reduce the stress on the ankle of the driver. That is, the target driving force with respect to the first position APO1 calculated based on the second control property is less than the target driving force with respect to the first position APO1 calculated based on the first driving force property. As described, such minimum target driving force possible to reduce the stress on the ankle may be obtained by conventional manners. For example, the minimum target driving force possible to reduce the stress on the ankle may be set based on a result of experiment or simulation. According to the second example, as indicated in FIG. 16, the target driving force is also changed based on the second driving force property from the first position APO1. In FIG. 16, the dashed-dotted line DC11 indicates the target driving force set based on the first driving force property, and the solid line DC12 indicates the target driving force set based on the second driving force property.

Figure 17:
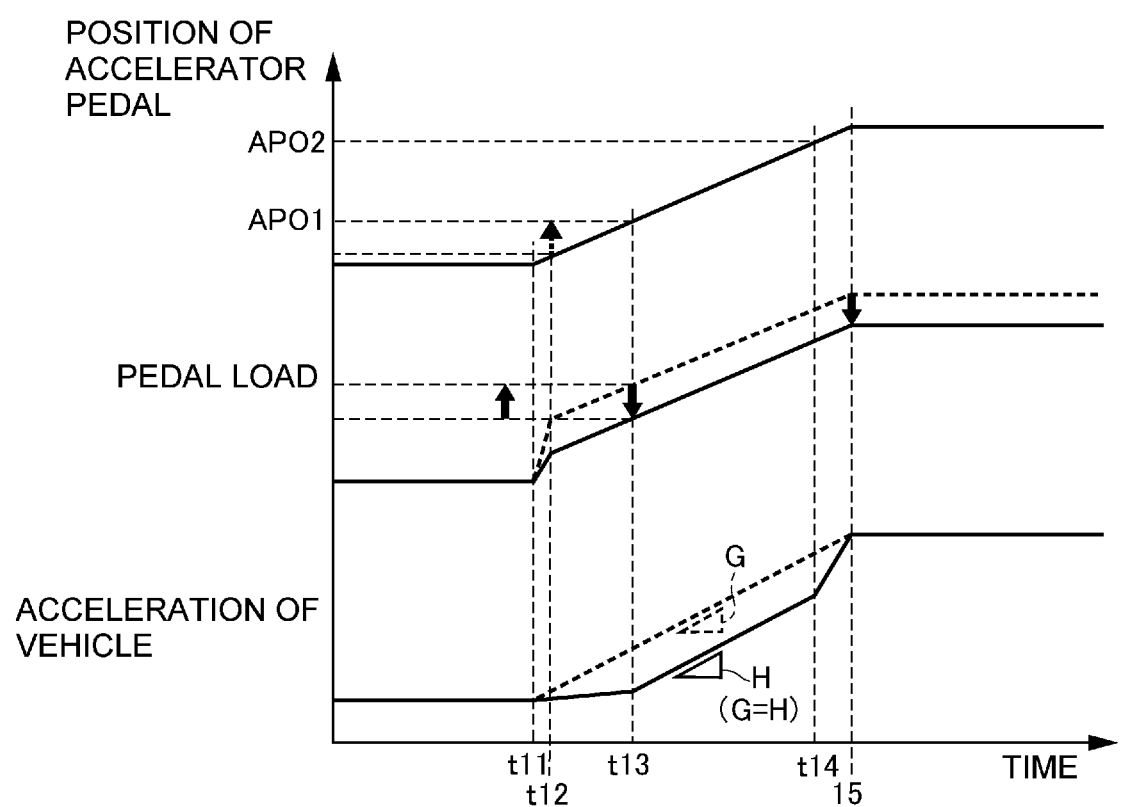
FIG. 17 is a time chart showing temporal changes in a pedal load and an acceleration of the vehicle with respect to a position of the accelerator pedal, during execution of the routine shown in FIG. 15.

At step S16, specifically, an amount of reduction in the pedal load of the accelerator pedal 3 by the actuator 10 is calculated based on an amount of change in the pedal load of the accelerator pedal 3 calculated at step S15. Turning to FIG. 17, there is shown a temporal change in the pedal load when depressing the accelerator pedal 3 from the initial position to the bottom during execution of the routine shown in FIG. 15. In the example shown in FIG. 17, the accelerator pedal 3 is depressed at point t11. Consequently, the pedal load starts increasing sharply from point t11, and further increases at a milder rate from point t12 as the accelerator pedal 3 is further depressed. Eventually, depression of the accelerator pedal 3 exceeds the second position APO2 at point t14, and the accelerator pedal 3 is fully depressed at point t15 so that the pedal load is stabilized. In this situation, as a result of shifting the property of the driving force from the first driving force property to the second driving force property, the position range of the accelerator pedal 3 between the first position APO1 and the second position APO2 is set as the usual position range of the accelerator pedal 3. When the target driving force is reduced based on the second driving force property, as indicated by the upward arrow in FIG. 17, the usual position range of the accelerator pedal 3 is shifted to the deeper range. Consequently, as also indicated by the upward arrow in FIG. 17, the pedal load is increased within the usual position range of the accelerator pedal 3. At step S15, therefore, a difference between the pedal load before increased and the pedal load at the first position APO1 after increased is calculated. Specifically, the amount of reduction in the pedal load of the accelerator pedal 3 by the actuator 10 is set to a same value as an amount of change in the pedal load changed by shifting the property of the driving force from the first driving force property to the second driving force property.

In addition, the amount of reduction in the pedal load of the accelerator pedal 3 by the actuator 10 may be adjusted based on a magnitude of stress on the ankle of the driver. For example, the amount of reduction in the pedal load of the accelerator pedal 3 by the actuator 10 may be increased with an increase in the stress on the ankle estimated at step S12. As described, the pedal load sensed by the driver changes depending on a size of the foot and a body shape of the driver. Accordingly, the stress on the ankle of the driver operating the accelerator pedal 3 changes depending on a size of the foot and a body shape of the driver. In this case, therefore, the amount of reduction in the pedal load of the accelerator pedal 3 by the actuator 10 may be set properly taking account of a size of the foot and a body shape of the driver.

In the case of reducing the pedal load by the actuator 10 and selecting the second driving force property, a jerk generated within the usual position range of the accelerator pedal 3 will not be changed from a jerk of the case in which the first driving force property is selected. In FIG. 17, an inclination G of the dashed-dotted line between point t13 and point t14 indicates the jerk within the usual position range of the accelerator pedal 3 being depressed in the case that the first driving force property is selected. Whereas, an inclination H of the solid line indicates the jerk of the case in which the second driving force property is selected. As can be seen from FIG. 17, the inclination H of the solid line is identical to the inclination G of the dashed-dotted line. That is, the jerk of the case in which the second driving force property is selected is identical to the jerk of the case in which the first driving force property is selected.

In the example shown in FIG. 17, the accelerator pedal 3 is depressed to the first position APO1 as the starting position of the usual position range of the accelerator pedal 3 at point t13, and the target driving force with respect to the first position APO1 is calculated based on the second control property from point t13. Consequently, the target driving force with respect to the first position APO1 is reduced less than the target driving force with respect to the first position APO1 calculated based on the first driving force property. At point t13, therefore, the acceleration of the case in which the second driving force property is selected is less than the acceleration of the case in which the first driving force property is selected.

After reducing the target driving force based on the second driving force property and reducing the pedal load by the actuator 10 at step S16, the routine returns.

Thus, in order to reduce the stress on the ankle of the driver depressing the accelerator pedal 3, the control system according to the exemplary embodiment of the present disclosure adjusts the property of driving force based on the estimated stress on the ankle. For example, when the estimated stress on the ankle of the driver is bearable and less than the correction threshold, the first driving force property is selected to set the standard target driving force with respect to a position of the accelerator pedal 3. By contrast, when the estimated stress on the ankle of the driver is equal to or greater than the correction threshold, the second driving force property is selected to reduce the target driving force with respect to a position of the accelerator pedal 3.

Specifically, in the case that the second driving force property is selected, the target driving force is reduced from that of the case in which the first driving force property at least at the first position APO1 of the accelerator pedal 3 as the starting position of the usual position range. In this case, therefore, the driver will depress the accelerator pedal 3 deeper to achieve a desired driving force, compared to the case in which the first driving force property is selected. According to the exemplary embodiment of the present disclosure, the driver does not have to keep the foot angle to a narrow angle to operate the accelerator pedal 3. For this reason, the stress on the ankle of the driver depressing the accelerator pedal 3 is reduced.

Figure 18:
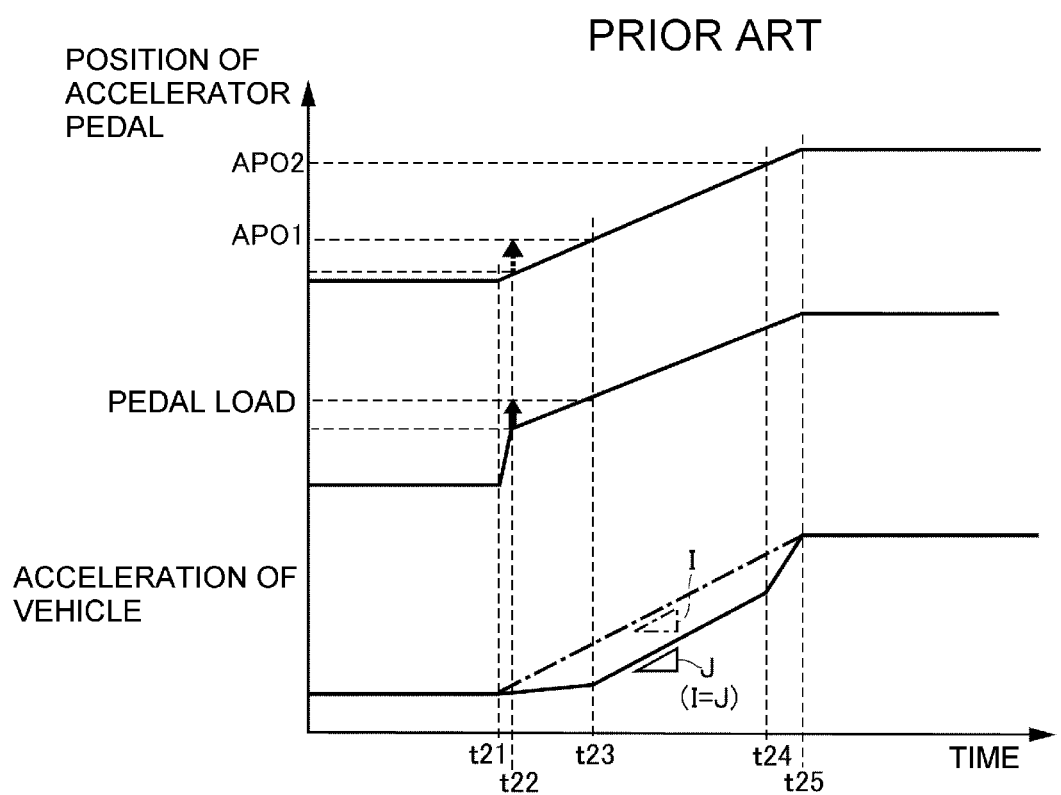
FIG. 18 is a time chart showing temporal changes in a pedal load and an acceleration of the vehicle with respect to a position of the accelerator pedal, during execution of the driving force control according to the prior art.

Turning to FIG. 18, there are shown temporal changes in a pedal load and an acceleration of a vehicle with respect to a position of an accelerator pedal according to the conventional art (described e.g., in JP-A-2015-209791) in which a driving force is not corrected by the foregoing procedures. In FIG. 18, an inclination I of the dashed-dotted line between point t23 and point t24 indicates a jerk of a case in which a target driving force is set based on a standard property corresponding to the first driving force property according to the embodiment of the present disclosure. Whereas, an inclination J of the solid line indicates the jerk of a case in which the property of driving force is corrected to reduce stress on an ankle of a driver by the conventional manner. As can be seen from FIG. 18, the inclination J of the solid line is identical to the inclination I of the dashed-dotted line. That is, the jerk of the case in which the property of driving force is corrected by the conventional manner is identical to the jerk of the case in which the target driving force is set based on the standard property. According to the conventional art, therefore, the stress on the ankle might be reduced by correcting the property of driving force to reduce the target driving force with respect to a position of the accelerator pedal. However, the driver might feel a lack of driving force or acceleration. That is, as a result of reducing the target driving force by the conventional manner, a pedal force required to depress the accelerator pedal deeper to generate a desired driving force would be increased in spite of the fact that the jerk with respect to a depression of the accelerator pedal is unchanged. For this reason, the driver might feel a lack of driving force or uncomfortable feeling.

Whereas, according to the exemplary embodiment of the present disclosure, the second driving force property is set so as to reduce a difference between: the ratio of acceleration of the vehicle Ve established by applying a pedal force to the accelerator pedal 3 from the driver to the pedal force given that the first driving force property is selected; and the ratio of acceleration of the vehicle Ve established by applying a pedal force to the accelerator pedal 3 from the driver to the pedal force given that the second driving force property is selected. In short, the ratio of the acceleration to the pedal force in the case that the second driving force property is selected will not be changed significantly from the ratio of the acceleration to the pedal force in the case that the first driving force property is selected. For this purpose, according to the routine shown in FIG. 9, the second driving force property is set such that a ratio of increase in the target driving force to an increase in depression of the accelerator pedal 3 given that the second driving force property is selected (indicated as an inclination D of the solid line DC2 in FIG. 10) is increased greater than a ratio of increase in the target driving force to an increase in depression of the accelerator pedal 3 given that the first driving force property is selected (indicated as an inclination C of the dashed-dotted line DC1 in FIG. 10). Instead, according to the routine shown in FIG. 15, the pedal load of the accelerator pedal 3 is reduced by the actuator 10.

According to the exemplary embodiment of the present disclosure, therefore, the ratio of the driving force (i.e., acceleration) to the pedal force is increased in the case that the target acceleration with respect to the position of the accelerator pedal 3 is reduced based on the second driving force property. That is, the difference between: the ratio of acceleration to the pedal force when the first driving force property is selected; and the ratio of acceleration to the pedal force when the second driving force property is selected, is reduced. For this reason, the physical stress on the driver to operate the accelerator pedal 3 can be reduced properly without causing a lack of driving force and acceleration by selecting the second driving force property. In other words, the physical stress on the driver to operate the accelerator pedal 3 can be reduced properly without reducing the acceleration feel by selecting the second driving force property.

Although the above exemplary embodiments of the present disclosure have been described, it will be understood by those skilled in the art that the present disclosure should not be limited to the described exemplary embodiments, and various changes and modifications can be made within the scope of the present disclosure.

What is claimed is:

1. A vehicle control system that is configured to:
   increase a reaction force of an accelerator pedal counteracting a pedal force applied to the accelerator pedal with an increase in depression of the accelerator pedal;
   determine a property of a driving force that governs a target driving force with respect to a position of the accelerator pedal;
   estimate a stress on an ankle and a leg of a driver operating the accelerator pedal on a seat of a vehicle based on a posture of the driver;
   select a first driving force property as a standard property in a case that the estimated stress on the ankle is less than a predetermined correction threshold;
   select a second driving force property in a case that the estimated stress on the ankle is equal to or greater than the correction threshold, so as to reduce the target driving force less than the target driving force determined based on the first driving force property within a usual position range of the accelerator pedal in an entire range of movement of the accelerator pedal, thereby reducing the stress on the ankle;
   calculate the target driving force based on the position of the accelerator pedal and the selected driving force property; and
   control the driving force to propel the vehicle based on the calculated target driving force,
   the vehicle control system comprising:
   a controller that selects the property of the driving force from the first driving force property and the second driving force property based on the estimated stress on the ankle, and that calculates the target driving force to propel the vehicle,
   wherein the controller is configured to:
   reduce the target driving force with respect to the position of the accelerator pedal less than the target driving force calculated based on the first driving force property when selecting the second driving force property; and
   reduce a difference between: a ratio of acceleration of the vehicle established by applying the pedal force to the accelerator pedal to the pedal force given that the first driving force property is selected; and a ratio of acceleration of the vehicle established by applying the pedal force to the accelerator pedal to the pedal force given that the second driving force property is selected.

2. The vehicle control system as claimed in claim 1, wherein the controller is further configured to reduce the difference between the ratios of the acceleration within the usual position range of the accelerator pedal, by increasing a ratio of an increase in the target driving force to an increase in the depression of the accelerator pedal given that the second driving force property is selected, greater than a ratio of an increase in the target driving force to an increase in the depression of the accelerator pedal given that the first driving force property is selected.

3. The vehicle control system as claimed in claim 2, wherein the controller is further configured to determine the ratio of the increase in the target driving force to the increase in depression of the accelerator pedal given that the second driving force property is selected based on the estimated stress on the ankle.

4. The vehicle control system as claimed in claim 1,
   wherein the vehicle comprises an actuator that changes the reaction force of the accelerator pedal, and
   the controller is further configured to reduce the difference between said ratios of the acceleration by reducing the reaction force of the accelerator pedal by the actuator.

5. The vehicle control system as claimed in claim 4, wherein the controller is further configured to determine an amount of reduction in the reaction force of the accelerator pedal by the actuator based on the estimated stress on the ankle.

* * * * *